US008555847B2

(12) United States Patent
Menin et al.

(10) Patent No.: US 8,555,847 B2
(45) Date of Patent: Oct. 15, 2013

(54) PROCESS FOR THE PRODUCTION OF AN INTAKE MANIFOLD AND CORRESPONDING MANIFOLD

(75) Inventors: Denis Menin, Labaroche (FR); Arnaud Lambert, Raves (FR)

(73) Assignee: Systemes Moteurs (SAS), Levallois-Perret (FR)

( * ) Notice: Subject to any disclaimer, the term of this patent is extended or adjusted under 35 U.S.C. 154(b) by 184 days.

(21) Appl. No.: 12/944,781

(22) Filed: Nov. 12, 2010

(65) Prior Publication Data

US 2011/0107996 A1 May 12, 2011

(30) Foreign Application Priority Data

Nov. 12, 2009 (FR) ..................................... 09 57974

(51) Int. Cl.
*F02M 35/104* (2006.01)
*F02D 9/10* (2006.01)

(52) U.S. Cl.
USPC . 123/184.61; 123/336; 123/337; 123/184.21; 123/184.52; 29/888.4

(58) Field of Classification Search
USPC ............. 123/184.21, 184.27, 184.38, 184.53, 123/184.54, 184.56, 184.61, 306, 336, 337, 123/432, 590; 29/888.4
See application file for complete search history.

(56) References Cited

U.S. PATENT DOCUMENTS

| 5,875,758 | A * | 3/1999 | Fujita ............................. 123/336 |
| 6,235,231 | B1 | 5/2001 | Martin |
| 6,763,802 | B1 * | 7/2004 | Brassell ......................... 123/336 |
| 6,945,199 | B2 * | 9/2005 | Kapala et al. ............... 123/41.01 |
| 7,228,834 | B2 * | 6/2007 | Letourneau ............... 123/184.21 |
| 7,231,898 | B2 * | 6/2007 | Letourneau et al. ..... 123/184.21 |
| 7,270,101 | B2 * | 9/2007 | Letourneau ............... 123/184.38 |
| 7,305,959 | B2 * | 12/2007 | Letourneau et al. ..... 123/184.38 |
| 7,353,801 | B2 * | 4/2008 | Winkelmuller et al. ...... 123/336 |
| 7,624,715 | B2 * | 12/2009 | Goldin et al. .................... 123/336 |
| 7,886,713 | B2 * | 2/2011 | Vichinsky ....................... 123/306 |
| 8,082,900 | B2 * | 12/2011 | Germain et al. ............... 123/336 |
| 2005/0034702 | A1 * | 2/2005 | Uchiyama ...................... 123/306 |
| 2007/0017468 | A1 | 1/2007 | Letourneau et al. |

(Continued)

FOREIGN PATENT DOCUMENTS

DE 10 2004 013309 A1 10/2005
EP 0 916 471 A1 5/1999

(Continued)

OTHER PUBLICATIONS

French Search Report, dated May 20, 2010, from corresponding French Application.

*Primary Examiner* — Lindsay Low
*Assistant Examiner* — Kevin Lathers
(74) *Attorney, Agent, or Firm* — Young & Thompson

(57) ABSTRACT

A intake manifold or splitter for an internal combustion engine and a process for production of same wherein a functional unit, comprised of a shaft with valves attached thereto, is assembled with bearing parts comprising clothespin-like clamps that clamp onto the shaft to form a sub-assembly which is mounted as a unit into receiving housing of the manifold or splitter, wherein a molding or over-molding at is provided at a level of the contact surface of a connection plate to lock the assembly of valves, shaft and bearings into the receiving housings and form sealing formations that seal against gases between the intake manifold or splitter and the internal combustion engine.

27 Claims, 8 Drawing Sheets

(56) References Cited

U.S. PATENT DOCUMENTS

2008/0035094 A1* 2/2008 Torii et al. ............... 123/188.14
2008/0271697 A1* 11/2008 Vichinsky ................ 123/184.56
2008/0314352 A1* 12/2008 Brosseau et al. ......... 123/184.56

FOREIGN PATENT DOCUMENTS

| | | |
|---|---|---|
| FR | 2 804 740 A1 | 8/2001 |
| FR | 2 816 006 A1 | 5/2002 |
| FR | 2 905 159 A1 | 2/2008 |

* cited by examiner

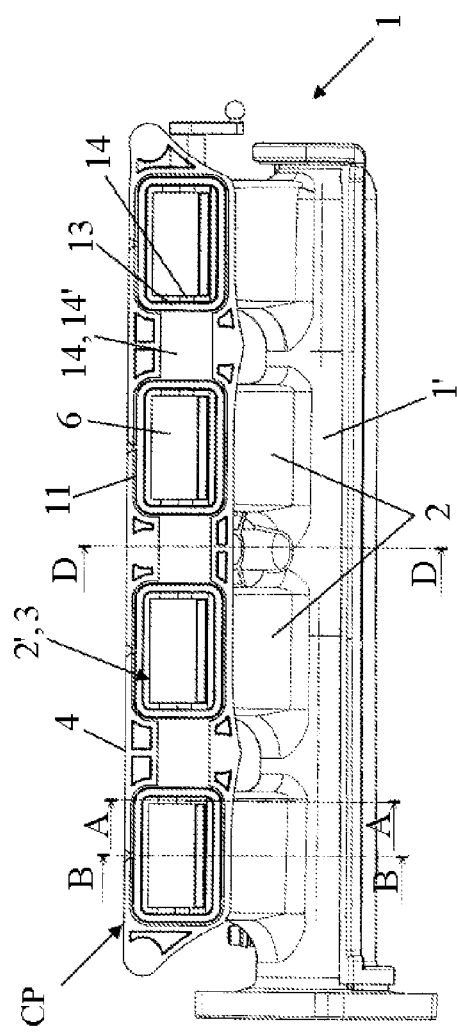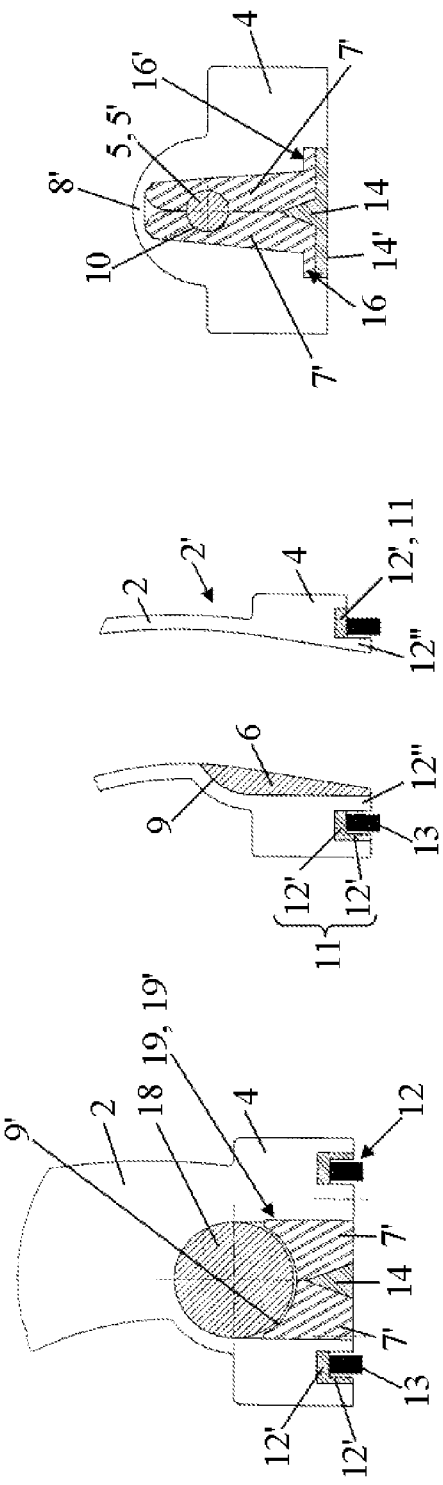

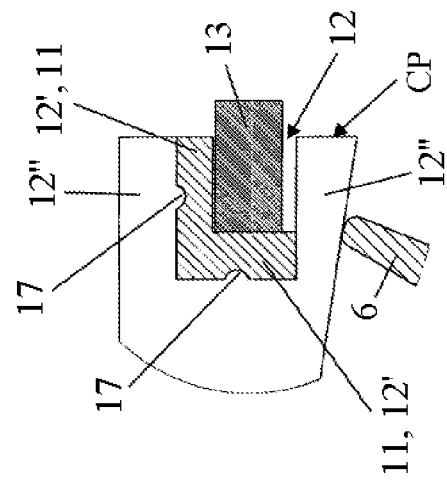
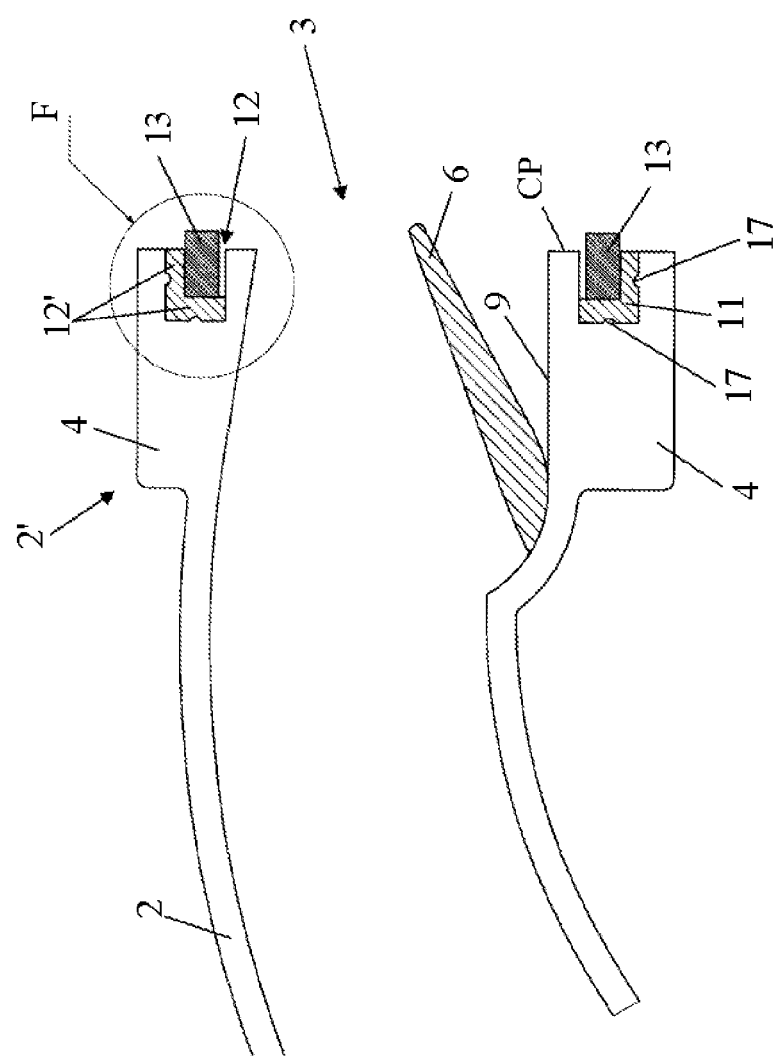
Fig. 7
Fig. 6

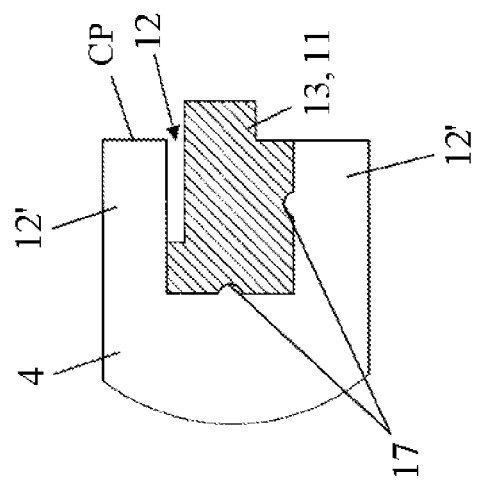
Fig. 9
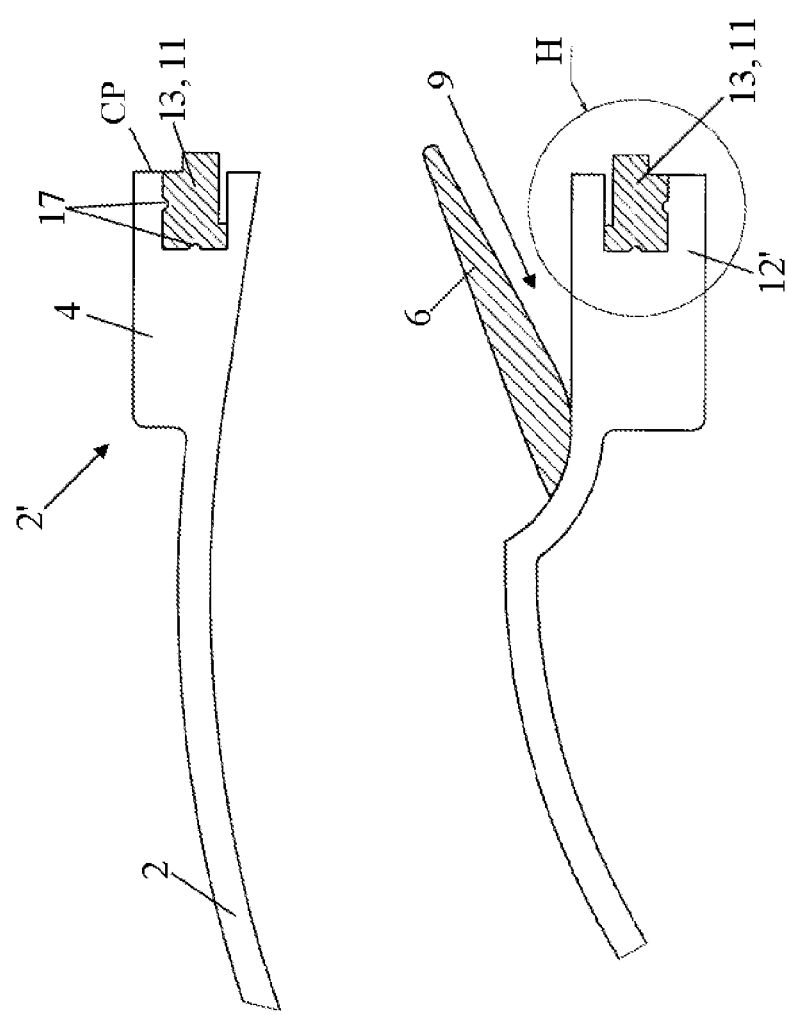
Fig. 8A
Fig. 8

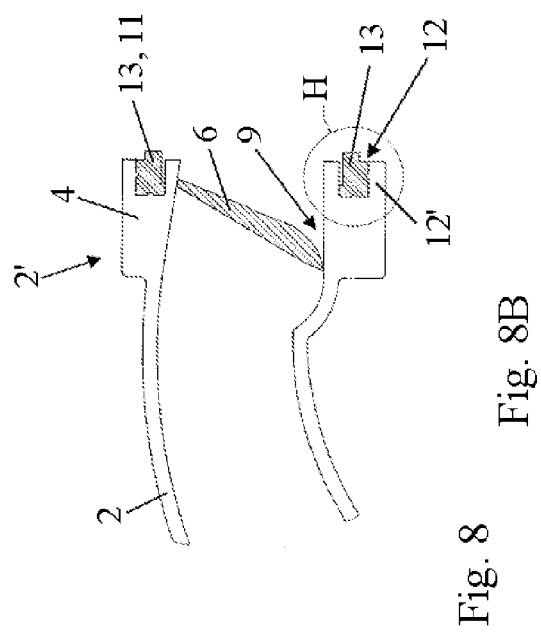
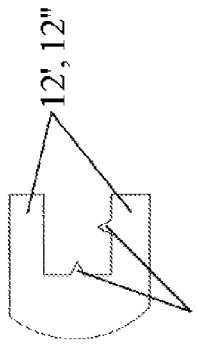

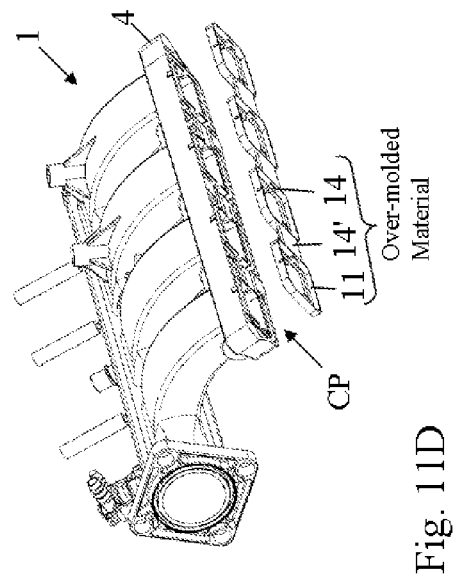
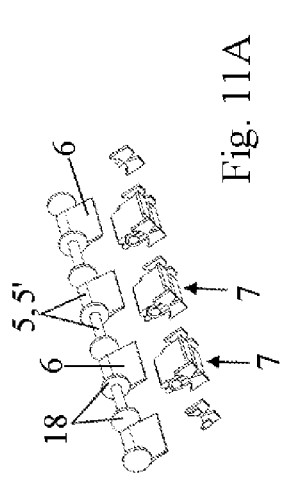
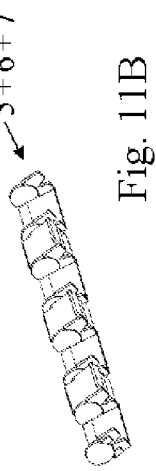
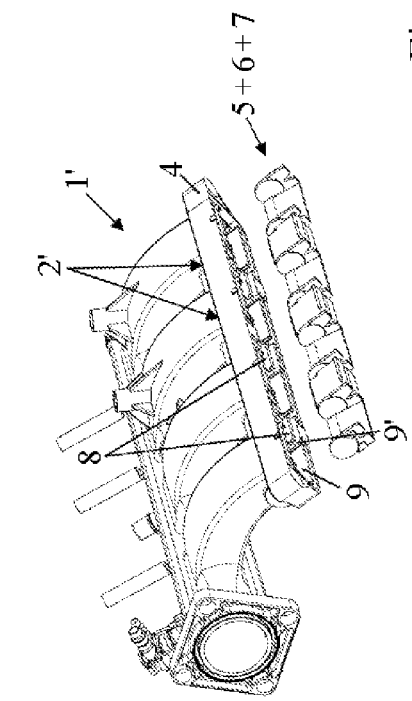
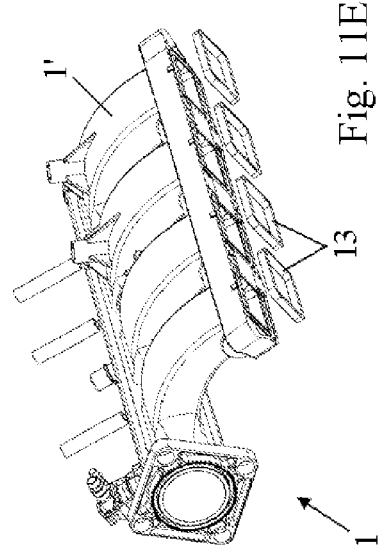
Fig. 11

PROCESS FOR THE PRODUCTION OF AN INTAKE MANIFOLD AND CORRESPONDING MANIFOLD

This invention relates to the field of intake manifolds or intake splitters for internal combustion engines, and it has as its object a process for the production of such a manifold or splitter, as well as a manifold or splitter, in particular obtained by this process.

Numerous different designs of manifolds or splitters are already known, as well as various corresponding production processes.

Among these existing manifolds or splitters, there are in particular those that comprise devices for regulating gas streams that circulate in the pipes, in particular in the form of valves mounted to pivot in the end portions of said pipes.

The integration of these regulating devices makes the production of such manifolds or splitters clearly more complex and difficult.

Actually, these devices should be mounted, optionally simultaneously, with their control shafts offset or passing through (thus also forming a support shaft) so as to all be able to move easily between their wide-open and closed positions, while producing a relative seal in each pipe and between the pipes, as well as an absolute seal between the pipes and the outside environment, both at the level of the manifold itself and at the level of the assembly interface with the cylinder head block.

The result is complicated designs requiring precise assembly of several parts in several consecutive operations, optionally with implementation of additional assembly parts, without, however, being able to reliably guarantee that all of the conditions are met.

In addition, subsequent operations may be necessary to rework or shape the assembly interface for the purpose of achieving a surface condition that makes it possible to ensure adequate sealing after mounting on the cylinder head block.

This invention has as its object to propose a solution for overcoming at least some, preferably all, of the above-mentioned drawbacks and to make the production process less complex and more efficient.

For this purpose, the invention has as its object a process for the production of an intake manifold or an intake splitter comprising several pipes that are provided with regulating valves and whose end parts defining the outlet openings are preferably mutually aligned and grouped into at least one unit structure at least one attachment and connection plate, suitable for the mounting of said manifold or splitter on the cylinder head block of an internal combustion engine, whereby said or each plate defines a contact surface, preferably a contact plane, for a sealed assembly with said cylinder head block or a portion of the latter, a process that is characterized in that it consists primarily in:

Providing, on the one hand, a functional unit [shaft/valves], and, on the other hand, parts to be inserted that form bearings, and, finally, a manifold body or splitter body having, at the attachment and connection plate and end portions of the pipes, recesses and/or housings for receiving the functional unit and above-mentioned parts to be inserted;

Mounting the parts that form bearings on the unit [shaft/valves], more particularly on the shaft segments that extend between the valves;

Installing the completed functional unit [shaft/valves/parts that form bearings] in the end portions and the recesses and/or housings for receiving;

Implementing a molding or over-molding at the level of the surface of the plate that is intended to come into contact with the cylinder head block and comprising the contact surface or contact plane, the material connected by molding or over-molding ensuring, on the one hand, the mechanical locking of the components of the completed functional unit in their recesses and/or housings that respectively receive them and that constitute, on the other hand, formations that work with or produce the sealing against gases between the end portions of the pipes and the cylinder head block, more particularly at the level of the contact surface or contact plane, as well as optionally between the pipes.

The invention also relates to an intake manifold or intake splitter that comprises several pipes whose end portions that define the outlet openings are mutually aligned and grouped in at least one unit structure at the level of at least one attachment and connection plate for the sealed mounting of said manifold or splitter on the cylinder head block of an internal combustion engine, whereby said or each plate defines a contact surface, preferably a contact plane, with said cylinder head block, whereby said manifold or splitter comprises a unit [shaft/valves] that is mounted in said end portions of the pipes and in said plate, in corresponding recesses and/or housings, manifold or splitter characterized in that it comprises, on the one hand, parts that form guide bearings in rotation of the unit [shaft/valves] in the form of inserts mounted in corresponding receiving housings, and, on the other hand, formations of over-molded material at the level of said surface of the plate that is intended to come into contact with the engine block and that advantageously defines a contact plane, whereby said formations that are connected by molding or over-molding ensure the mechanical locking of the functional unit and parts to be inserted in their respective recesses or housings and constitute formations that work with or produce the sealing against gases between the end portions of the pipes and the cylinder head block, more particularly at the level of the contact surface or the contact plane, as well as optionally between the pipes.

The invention will be better understood owing to the description below, which relates to preferred embodiments, provided by way of nonlimiting examples and explained with reference to the accompanying diagrammatic drawings, in which:

FIG. 4 is an elevation view in a direction that is perpendicular to the contact plane of the plate of the manifold that is shown in FIGS. 1 and 2;

FIGS. 5A, 5B and 5C are partial cutaway views respectively along A-A, B-B, and D-D of the plate and an end portion of the pipe of the manifold of FIG. 4;

FIG. 6 is a partial cutaway view of an end portion of a pipe that is similar to that of FIG. 5B, but on a different scale, according to the first embodiment of the invention;

FIG. 7 is a view on a different scale of the detail F of FIG. 6;

FIGS. 8A and 8B are partial cutaway views that are similar to that of FIG. 6 of an end portion of the pipe according to a second embodiment of the invention, whereby the valve is in two different positions;

FIG. 9 is a view on a scale that is different from the detail H of FIGS. 8A and 8B;

FIG. 10 is a view that is similar to those of FIGS. 7 and 9 of details F and H before the over-molding operation, and FIGS. 11A to 11E are perspective views that illustrate the primary stages of the production process according to a first embodiment of the invention.

Figure 1:
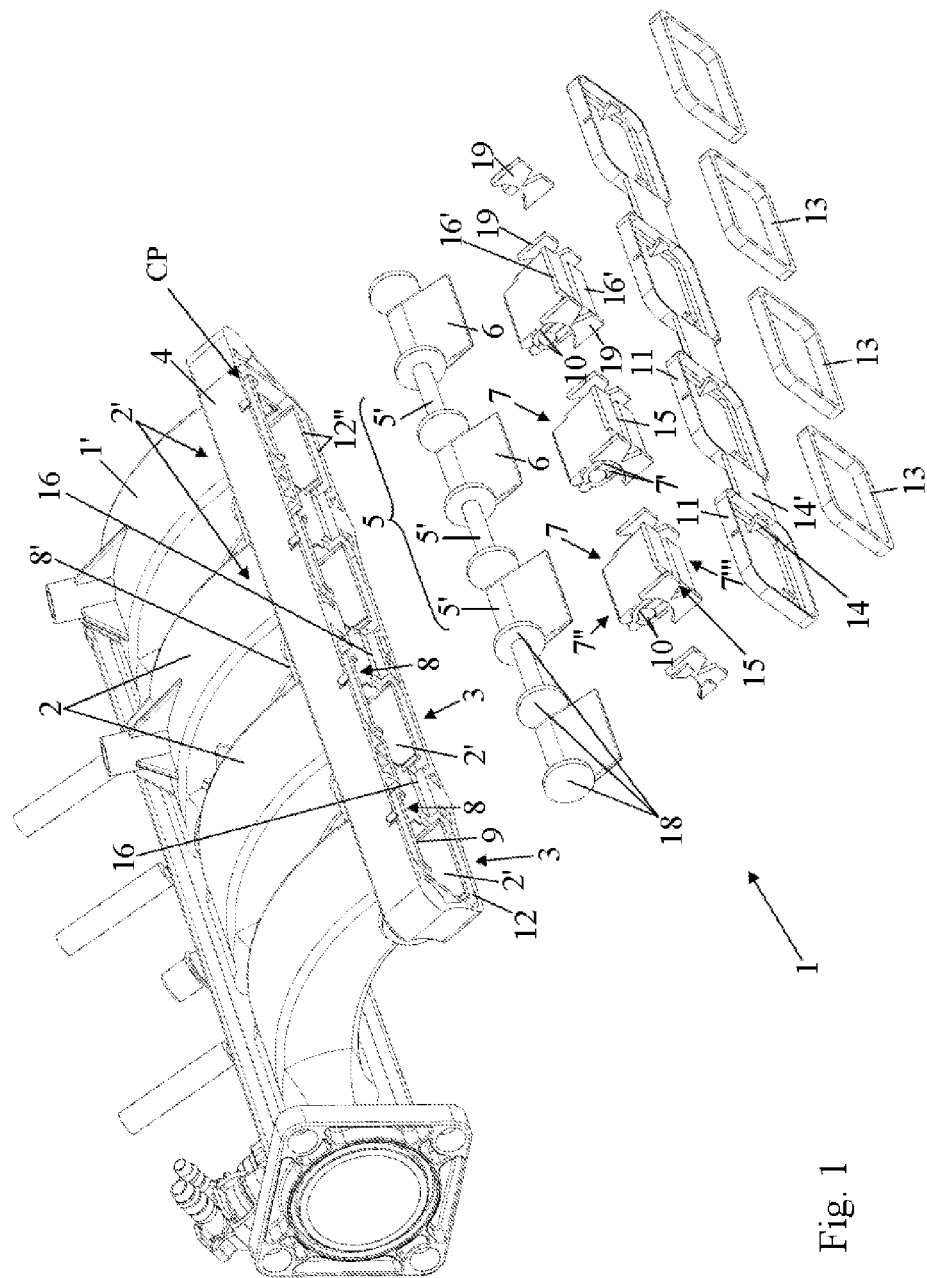
FIG. 1 is an exploded perspective view of an intake manifold or intake splitter according to a first embodiment of the invention.
Figure 1A:
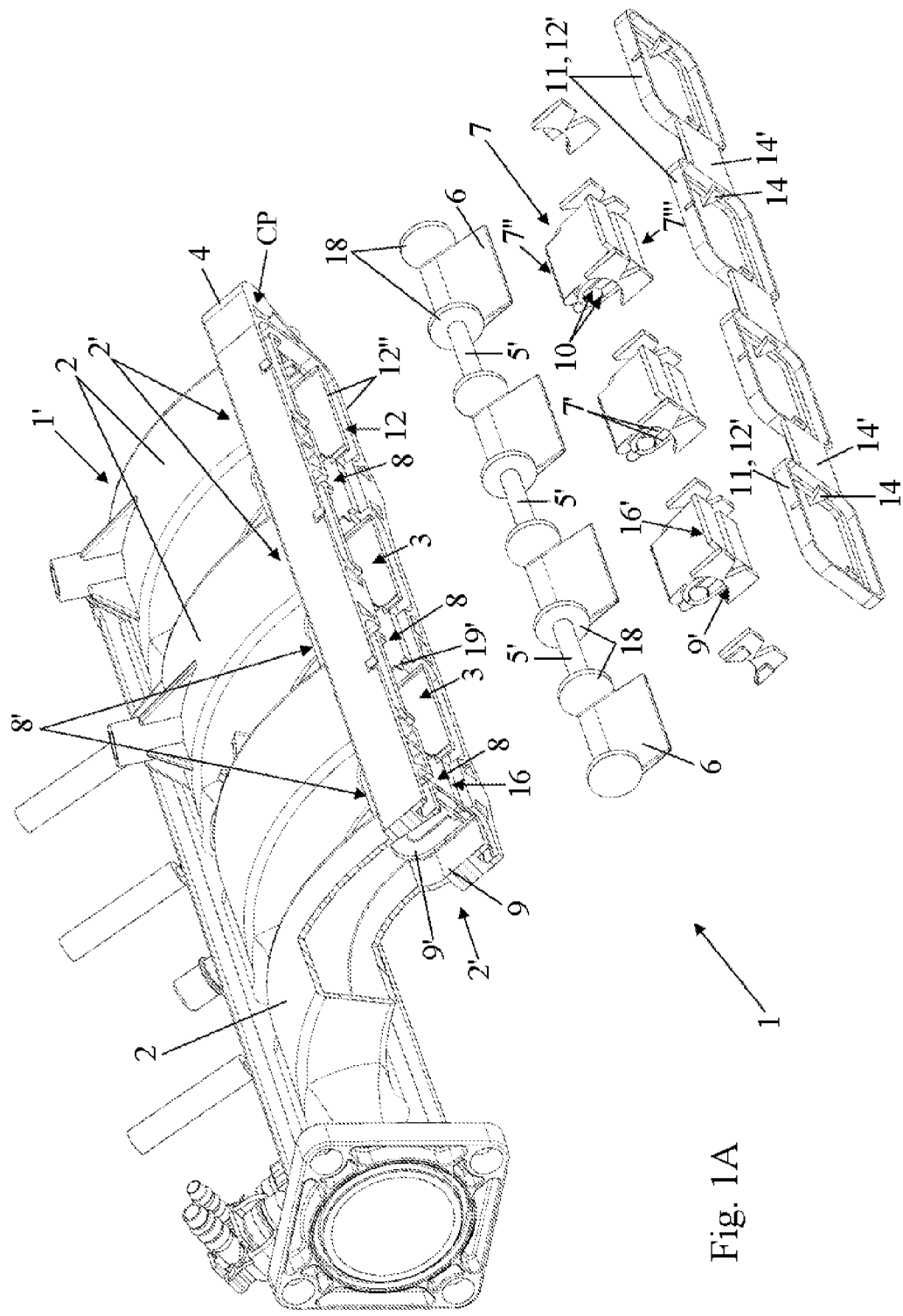
FIG. 1A is an exploded perspective and partial cutaway view of the manifold of FIG. 1.
Figure 2:
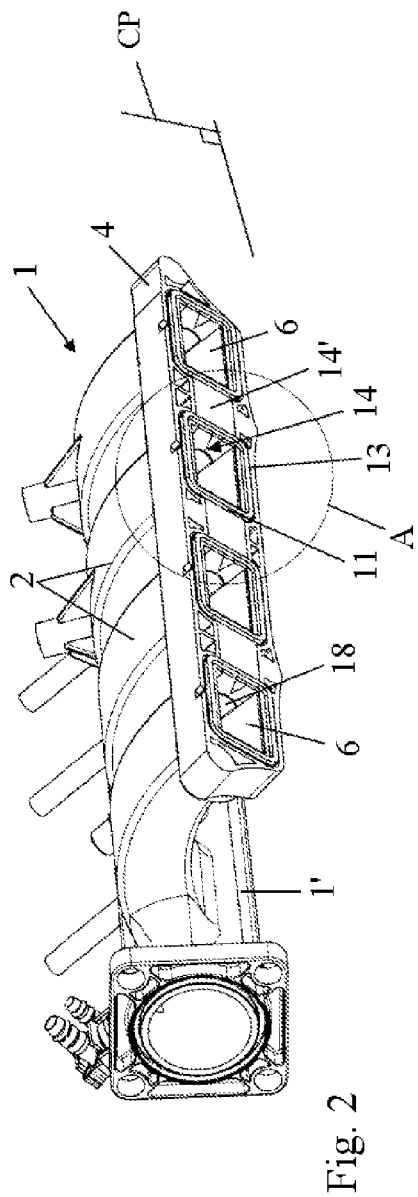
FIG. 2 is a perspective view of the manifold of FIG. 1 at the end of the production process according to the invention.
Figure 3:
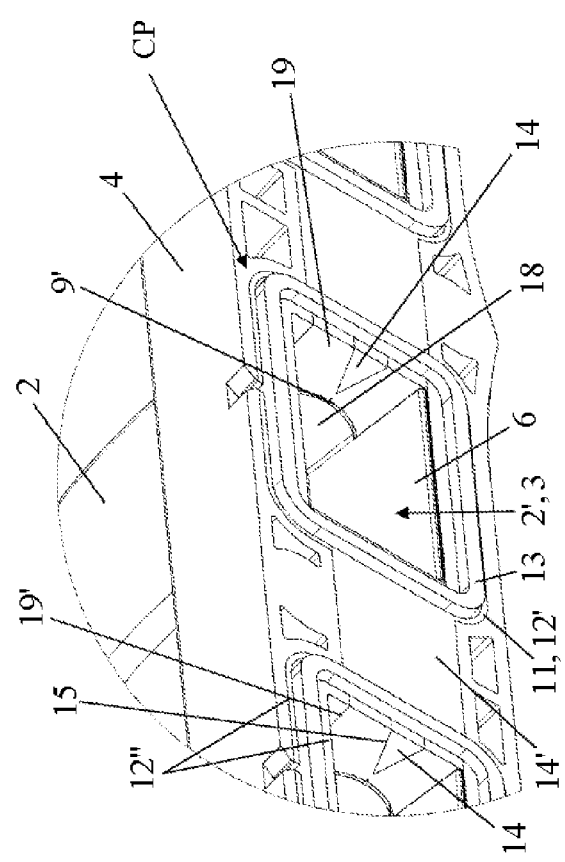
FIG. 3 is a view on a scale that is different from the detail A of FIG. 2.

The figures of the accompanying drawings, in particular FIGS. 1 and 1A in combination with FIGS. 11A to 11E, illustrate a process for the production of an intake manifold or intake splitter 1 comprising several pipes 2 that are provided with regulating valves and whose end parts or portions 2' that define the outlet openings 3 are preferably mutually aligned and grouped into at least one unit structure at the level of at least one attachment and connection plate 4.

This or each plate 4 is suitable for the mounting of said manifold or splitter 1 on the cylinder head block of an internal combustion engine and defines a contact surface CP, preferably a contact plane, for a sealed assembly with said cylinder head block or a portion of the latter.

According to the invention, this process consists in:

Providing, on the one hand, a functional unit [shaft 5/valves 6], and, on the other hand, parts 7 to be inserted that form bearings, and, finally, a manifold body 1' or splitter body 1 having, at the level of the attachment and connection plate 4 and end portions 2' of the pipes 2, recesses and/or housings 8, 9, 9' for receiving the functional unit 5, 6 and above-mentioned parts 7 to be inserted;

Mounting the parts 7 that form bearings on the unit [shaft 5/valves 6], more particularly on the shaft segments 5' that extend between the valves 6;

Installing the completed functional unit [shaft 5/valves 6/parts that form bearings 7] in the end portions 2' and the recesses and/or housings for receiving 8, 9, 9';

Implementing a molding or over-molding at the level of the surface of the plate 4 that is intended to come into contact with the cylinder head block and comprising the contact surface or contact plane CP, the material connected by molding or over-molding ensuring, on the one hand, the mechanical locking of the components of the completed functional unit 5, 6, 7 in their recesses and/or housings 2', 8, 9, 9' that respectively receive them and that constitute, on the other hand, formations 11, 14, 14' that work with or produce the sealing against gases between the end portions 2' of the pipes 2 and the cylinder head block, more particularly at the level of the contact surface or contact plane CP, as well as optionally between the pipes 2.

Thus, by providing parts 7 that form bearings to be inserted, the invention makes it possible to produce an intake manifold or intake splitter 1 that comprises regulating devices 6 that are integrated at the level of the plate 4 with their support and control shaft 5, while avoiding a production of complex and precise shapes (bearings) at the level of the device 1' of said manifold 1.

The parts 7 that form bearings being connected individually and separately on the shaft 5, between the valves 6, they can be mounted individually by adjusting, close to the local configuration of the shaft 5, valves 6 and receiving sites 8, 9, 9' of the body 1' of the manifold, unlike an integral complex part whose local adaptation possibilities are necessarily more limited and the adjusted mounting more difficult.

In addition, the molding or over-molding operation makes it possible to lock the rotating assembly of the shaft 5 and valves 6 and simultaneously to finalize the structure of the interface at the level of the contact surface CP, for example by contributing to the surface quality of the plate 4 at the level of this surface and by setting in place favorable conditions for producing a good assembly seal with the cylinder head block.

The process for production is thereby made less complex and more efficient, whereby the mounting of the shaft 5, valves 6, and bearings 7 is performed in a single operation (after their preassembly in the form of a complete functional unit 5+6+7) and their sealed locking in the mounted state is achieved by means of a single molding or over-molding operation, without requiring the attachment part and without using the bonding substance.

The provision of a complex shape, preferably in one piece and extending over approximately the full extent of the contact surface CP, combined with a contact with close interlocking of shapes with the recesses made in the plate 4 and local covering of the components 5, 6, 7 of the functional unit, makes it possible to achieve a mechanically strong and sealed hooking of the material over-molded onto the body of the manifold.

One skilled in the art understands, of course, that the invention can be applied to a manifold or splitter 1 that is provided with any number of pipes (2, 3, 4, 6, 8, 12, etc.), whereby these pipes 2 can be grouped into one or more unit structures that each correspond to a plate 4.

The or each plate 4 integrates attachment sites on the cylinder head block (eyelets or attachment lugs for screws) and preferably has a general flat shape with a flat contact surface CP (optionally provided with projecting centering lugs or pins). However, and although not shown in the accompanying drawings, a non-flat shape of the contact surface CP can also be considered within the scope of the invention.

The following description and the accompanying figures relate more specifically, but in a nonlimiting manner, to a manifold 1 with a single plate 4 and four pipes 2.

According to a first characteristic of the invention, emerging more particularly from FIGS. 1, 3, 5A, 5B and 11A to 11C, provision can be made to provide parts that form bearings 7 that are each composed of two mutually complementary branches 7', with front ends 7" and rear ends 7'", each branch 7' having a recess 10 that defines a portion of the rotating bearing, to mount the parts that form bearings 7 on the unit [shaft 5/valves 6] by drawing together the two branches 7' of said parts 7 and by clamping the shaft segments 5' that extend between two consecutive valves 6 between the parts of bearings 10 of the branches 7' of each of said parts 7 that are concerned, and to introduce, if necessary with an essentially adjusted interlocking, said parts that form bearings 7 in suitable housings 8 that are formed or made in the plate 4 and located between the end portions 2' of the pipes 2, this simultaneously with the installation of valves 6 in the latter, whereby the front ends 7" of the branches 7' of the parts that form bearings 7 are located at the bottom of said housings 8.

The plate 4 that is considered advantageously has, between the pipes 2, wall portions 8' that define the envelope parts forming these housings 8, and the parts 7 have a general clothespin shape; a locking of two branches 7' in contact can be provided so as to prevent their disengagement from the shaft 5, for example by elastic interlocking ("clipping").

According to a first embodiment of the invention, shown in FIGS. 1 to 7, 10 and 11, the process can consist in providing molded or over-molded formations 11, 14, 14' that together constitute an integral structure and that comprise, on the one hand, annular formations 11 that form or cover the walls 12' with grooves 12 for receiving sealing joints 13, each extending around an outlet opening 3 of the pipe 2, and, on the other hand, material bridges 14, 14' that connect said annular formations 11 to one another and cover the parts that form bearings 7 by locking them in their respective receiving housings 8, whereby said formations 11, 14, 14' are essentially flush at the level of the contact surface or the contact plane CP of the plate 4.

The over-molding operation thus makes it possible to finalize the geometry of the grooves 12 for optimal assembly of joints 13, the latter being at least slightly projecting relative to the plane CP.

According to one characteristic of this first embodiment, and as FIGS. 6, 7 and 10 show, the end portions 2' of the pipes 2 comprise, around the outlet openings 3, outlines of grooves 12 into which the molding or over-molding material of the annular formations 11 is injected to constitute at least one of the inside walls 12' of said grooves 12, in particular the bottom wall and/or the outside wall, whereby the walls 12" of these outlines of grooves 12 intended to be over-molded comprise projecting formations 17, such as, for example, ribs with a triangular cross-section, designed to promote the hooking of the molding or over-molding material and the seal between the latter and the inside wall(s) 12' in contact therewith.

According to a second embodiment of the invention, emerging from FIGS. 8A, 8B, 9 and 10, the process can consist in providing molded or over-molded formations 11, 14, 14' that together constitute an integral structure and that comprise, on the one hand, annular formations 11 that are accommodated in grooves 12 that are formed in the plate 4 and that each extend around an outlet opening 3 of one of the pipes 2 and that each constitute a sealing joint 13 for the corresponding outlet opening 3, and, on the other hand, material bridges 14, 14' that connect said annular formations 11 to one another and cover the parts that form bearings 7 by locking them in their respective receiving housings 8, whereby said formations 11, 14, 14' are essentially flush at the level of the contact surface or the contact plane CP of the plate 4. The portions of the formations 11 that act as joints 13 are, however, slightly projecting relative to the plane CP (in the uncompressed state).

In the two above-mentioned embodiments, the over-molding or molding is carried out in such a way that the material for molding or over-molding of annular formations 11 is brought into close contact with at least one of the inside walls 12' of the grooves 12 that are respectively concerned, in particular at least with the bottom wall, whereby said wall(s) 12' comprise projecting formations 17, such as, for example, ribs with a triangular cross-section, intended to promote the hooking of the molding or over-molding material and the seal between the latter and the inside wall(s) 12' in contact therewith.

Such formations 17 can optionally also be provided in the V-shaped recesses that form the grooves 15 at the level of the parts 7 and recesses of the plate 4 making possible the production of molded or over-molded formations 14 and 14'.

These technical measurements and arrangements in particular can take into account the teaching that is disclosed by the documents FR 2 911 812 and US 2008 211194.

According to an advantageous structural variant, emerging in particular from FIGS. 1, 5A, 5C and 11 and being applied to two above-mentioned embodiments, the process can consist in providing the two branches 7' of each part that forms a bearing 7 with rear ends 7'" that are beveled so as to delimit a groove 15 in the shape of a corner between these two branches 7' when the latter are drawn closer so as to constitute a guide bearing in rotation, with the over-molded material 14, 14' filling the grooves at the corners 15 of different parts that form bearings 7, which are apparent at the level of the contact surface or the contact plane CP of the plate 4 when said parts 7 are arranged in their corresponding receiving housings 8.

Likewise, the process can consist in ensuring a mechanical wedging and/or a stop of the parts that form bearings 7 in their mounting position or final engagement position in their respective housings 8, for example by coming into contact with complementary shoulders 16 and 16', and in covering at least a portion of the rear ends 7'" of the branches 7' of said parts that form bearings 7, located set back relative to the contact surface or the contact plane CP of the plate 4, with the over-molding material.

According to the third embodiment of the invention, not shown in the accompanying drawings, the process can consist in providing molded or over-molded formations that together constitute an integral structure, comprising parts at least of the plate 4 and optionally parts of pipes 2, advantageously at the level of their end portions 2' and/or their respective outlet openings 3, complementary to the manifold or splitter body 1', and defining at least partially the contact surface of the plate 4, as well as the sealing means 13 of the assembly of said plate 4 with the cylinder head block or the sites for receiving such sealing means 13, the molding or over-molding material being compatible with the material that constitutes the manifold or splitter body 1', preferably identical to the latter.

Preferably, the thermoplastic molding or over-molding material that constitutes the formations 11, 14, 14' is selected for being compatible with the thermoplastic material that forms the manifold or splitter body 1' and for having a softening temperature that is essentially equivalent to that of this latter material, so as to bring about an at least superficial softening, advantageously a superficial refusion with mixing of the phases, said material of the manifold or splitter body 1', in particular a partial refusion of projecting formations 17, whereby the materials of the formations 11, 14, 14' and of the body 1' are preferably identical.

For the production of the shaft 5/valves 6 unit, several variants are conceivable.

Thus, the shaft 5 and the valves 6 can be made of a metallic material.

However, in an advantageous manner, it can be provided to produce the unit [shaft 5/valves 6] by over-molding of the valves 6, partially or completely, onto the shaft 5, whereby the latter optionally comprises premounted valve reinforcing structures.

Preferably, it is provided to produce the unit [shaft 5/valves 6] in a single piece by molding, whereby said individual unit 5, 6 comprises an alternating series of valves 6 and segments of shaft 5' in a single piece.

According to a favorable, practical structural variant, in particular in terms of the limitation of feedstock losses in the pipes 2, the valves 6 are positioned in an offset manner relative to the shaft or the shaft segments 5, and each of the end portions 2' of the pipes 2 comprises an inside recess 9 whose imprint has a shape that mates with that of the valve 6 that is mounted in said end portion 2' (FIGS. 5B, 6, 8A and 8B).

As FIGS. 1, 5A and 11A to 11C show, it can thus be provided to produce, during over-molding or molding, disk-shaped formations 18 on both sides of each valve 6, whereby these formations 18 are centered relative to the shaft 5 that bears the valves 6 or relative to the segment of shaft 5' that is adjacent to the valve 6 under consideration, in exhibiting a diameter that is greater than said shaft 5 or segment 5'.

These disk-shaped formations 18 ensure the connection between the segments of shaft 5' and the valves 6, without impeding the ability to rotate around the shaft 5.

So as to achieve a mounting that is interlocked and wedged between the unit 5 and 6, the pipes 2 and the parts 7, the end portions 2' of the pipes 2, and the parts that form bearings 7 comprise respective lateral recesses 9' that define, by mutual cooperation after installation of said parts 7 in their respective housings 8, cleared sites or recesses for the adjusted reception with the ability of said disk-shaped formations 18 to rotate, whereby the latter ensure the continuity of the inside surface of the end portions 2' of the pipes 2 in question.

The formations 18 thus also work with the seal at the level of the rotational bearing (creation of baffles) and in the axial locking of the valves 6.

Preferably, it is also provided that the body of manifold 1', the unit [shaft 5/valves 6], and the parts that form bearings 7 are made of a thermoplastic material, optionally loaded, in that the body of manifold 1' is produced by assembling at least two elementary constituent parts, by vibration welding, bonding, etc., in that the two branches 7' of the parts 7 that form bearings are connected, at the level of their front ends 7", by a fabric of material forming a hinge, and in that after the over-molding operation, optionally the installation of the sealing joints 13 is initiated at the level of the grooves 12 that extend around the outlet openings 3 of the pipes 2, and the installation of the functional attachment accessories of the manifold 1 is initiated.

The invention also has as its object an intake manifold or intake splitter 1 that comprises several pipes 2 whose end portions 2' that define the outlet openings 3 are preferably mutually aligned and grouped in at least one unit structure at the level of at least one attachment and connection plate 4 for the sealed mounting of said manifold or splitter 1 on the cylinder head block of an internal combustion engine.

Said or each plate 4 defines a contact surface CP, preferably a contact plane with said cylinder head block, and said manifold or splitter comprises a unit [shaft 5/valves 6] that is mounted in said end portions of the pipes and in said plate, in corresponding recesses and/or housings 8, 9, 9'.

According to the invention, this manifold or splitter 1 comprises, on the one hand, parts 7 that form guide bearings in rotation of the unit [shaft 5/valves 6] in the form of inserts that are mounted in corresponding receiving housings 8, and, on the other hand, formations 11, 14, 14' of material that is over-molded at the level of said surface of the or of each plate 4 that is designed to come into contact with the engine block and that advantageously defines a contact plane CP, whereby said formations 11, 14, 14' that are connected by molding or over-molding ensure the mechanical locking of the functional unit 5, 6 and parts to be inserted 7 in their respective recesses and/or housings 2', 8, 9, 9' and constitute formations 11, 14, 14' that work with or produce the sealing against gases between the end portions 2' of the pipes 2 and the cylinder head block, more particularly at the level of the contact surface or the contact plane CP, as well as optionally between the pipes 2.

According to a first structural characteristic, each part that forms a bearing 7 can consist of two branches 7', each having a semi-cylindrical recess 10, defining complementary cylindrical rotational bearing parts, whereby said parts that form bearings 7 are mounted with adjusted interlocking in their respective housings 8 by clamping the shaft segments 5 at the level of the recesses 10 opposite their pairs of branches 7' that are in contact and by being locked in position in their housings 8 by the molded or over-molded material.

According to a first embodiment (FIGS. 1 to 7 and 11), the formations 11, 14, 14' of molded or over-molded material together constitute an integral structure that integrates, on the one hand, annular formations 11 that form or cover walls 12' with receiving grooves 12 of sealing joints 13, each extending around an opening 3 of pipe 2, and, on the other hand, material bridges 14, 14' that connect said annular formations 11 to one another and cover the parts that form bearings 7 by locking them in their respective receiving housings 8, whereby said formations 11, 14, 14' are essentially flush at the level of the contact surface or contact plane CP of the plate 4.

According to a second embodiment (FIGS. 8A, 8B and 9), the formations 11, 14, 14' of molded or over-molded material together constitute an integral structure that integrates, on the one hand, annular formations 11 that are accommodated in grooves 12 that are formed in the plate 4 and that each extend around an outlet opening 3 of one of the pipes 2 and that each constitute a sealing joint 13 for the corresponding outlet opening 3, and, on the other hand, material bridges 14, 14' that connect said annular formations 11 to one another and cover the parts that form bearings 7 by locking them in their respective receiving housings 8, whereby said formations 11, 14, 14' are essentially flush at the level of the contact surface or contact plane CP of the plate 4.

Advantageously, the parts that form bearings 7 have, at the level of the rear ends 7''' of their branches 7' that are close to the contact surface or contact plane CP, a groove 15 with a triangular cross-section or a wedge shape, delimited by bevels opposite said branches 7', the material bridges 14, 14' formed by the molded or over-molded material integrating formations at the corners 14 extending in an adjusted manner into these grooves 15.

In addition, each part that forms a bearing 7 is provided with at least one shoulder 16' or the like, for example in the form of lateral wings, in contact with at least one shoulder 16 that mates with the corresponding receiving housing 8 and in that at least one portion of the rear ends 7''' of the branches 7' of each part 7 is set back relative to the contact surface or the contact plane CP of the plate 4 and is covered by a portion 14' of over-molding material that is essentially in plate form, being part of a material bridge and essentially flush with the contact surface or the contact plane CP.

According to an advantageous but nonlimiting practical embodiment, the unit [shaft 5/valves 6] is an integral part that comes from molding, comprising an alternating series of valves 6 and segments of shaft 5 in a single piece, in that it comprises disk-shaped formations 18 on both sides of each valve 6 (by being preferably formed by a single piece with the latter), these formations 18 being centered relative to the shaft 5 that bears the valves 6 or relative to the shaft segment 5 that is adjacent to the valve 6 in question, in exhibiting a diameter that is greater than said shaft or segment 5. In addition, the end portions 2' of the pipes 2 and the parts that form bearings 7 comprise respective lateral recesses 9' that define, by mutual cooperation, offset sites or recesses for the adjusted reception with the ability of said disk-shaped formations 18 to rotate, whereby the latter ensure the continuity of the inside surface of the end portions 2' of the pipes 2 in question.

Thus, the invention rests essentially on the embodiment of a molding or over-molding at the level of the surface that is intended to come into contact with the cylinder head block, for ensuring simultaneously, on the one hand, a mechanical locking of the unit [shaft+valves+bearings] in their housing and, on the other hand, a sealing against gases at the contact plane with the cylinder head block, and optionally between the different pipes.

The parts 7 that form bearings, which are advantageously generally wedge-shaped, can also comprise—on their opposing lateral sides—guide skids 19 and wedged mounting, designed to work with recesses 19' of a complementary shape located in the lateral sides of the housings 8. These skids 19 preferably define the partial recesses 9' for the formations 18.

The grooves 15 can advantageously extend at the level of these skids 19 (these skids being formed by, for example, two parts of which each is carried by a branch 7', and isolated skids (not belonging to a part 7) can be provided for the formations 18 at the ends of the shaft 5 (see FIG. 1).

As FIGS. 1 and 11 in particular show, the valves 6 can be positioned in an offset manner relative to the shaft or to shaft segments 5, and each of the end portions 2' of the pipes 2 can comprise an inside recess 9 whose imprint has a shape that mates with that of the valve 6 that is mounted in said end portion 2'.

According to additional arrangements according to the invention, the manifold body 1', the unit [shaft 5/valves 6], and the parts that form bearings 7 are made of a thermoplastic material, optionally loaded, whereby the molded or over-molded material is compatible with said above-mentioned thermoplastic material and preferably identical to the latter; the manifold body 1' is produced by assembling at least two elementary constituent parts, by vibration welding, bonding, etc., and the two branches 7' of the parts 7 that form bearings are connected, at their front ends 7", by a fabric of material forming a hinge.

This manifold or splitter 1 that is described above is preferably obtained by means of the production process whose characteristics were disclosed above.

Finally, the invention also relates to a motor vehicle with an internal combustion engine, characterized in that its intake system comprises a manifold or splitter 1 as described above.

Of course, the invention is not limited to the embodiments that are described and shown in the accompanying drawings. Modifications are possible, in particular from the standpoint of the composition of the various elements or by substitution of equivalent techniques, without thereby exceeding the field of protection of the invention.

The invention claimed is:

1. A process for production of an intake manifold or splitter (1) to be mounted on a cylinder head block of an internal combustion engine, the process comprising:
   providing
   a functional unit, comprised of a shaft (5) with valves (6) attached thereto,
   ii) bearing parts (7) comprising clothespin-like clamps that each comprise two opposing and mutually complementary branches (7') each with a front end (7") and a rear end (7"'), each branch (7') having a recess (10) defining a portion of a rotary bearing, and
   iii) an intake manifold or splitter body (1') having a plurality of pipes (2) provided with end portions (2') defining outlet openings attached to at least one connection plate (4) that is configured for mounting said intake manifold or splitter (1) on the cylinder head block of the internal combustion engine, said at least one connection plate (4) defining a contact surface for sealing said intake manifold of splitter (1) with said cylinder head block,
   the intake manifold or splitter body (1') having, formed in the at least one connection plate (4) between the end portions (2') of the pipes (2), receiving housings (8) for receiving the functional unit (5, 6) and the bearing parts (7);
   mounting the bearing parts (7) onto shaft segments (5') of the shaft (5) that extend between the valves (6) of the functional unit by drawing together the opposing branches (7') of corresponding bearing parts (7) and clamping the shaft segments (5') inside the recesses (10) of the corresponding bearing parts (7) to form a completed sub-assembly (5, 6, 7);
   installing the completed sub-assembly (5, 6, 7) in the end portions (2') and the receiving housings (8) of the manifold or splitter body (1') by introducing said bearing parts (7) into the receiving housings (8) of the at least one connection plate (4), the front ends (7") of the branches (7') being located at a bottom of said receiving housing (8); and
   implementing a molding or over-molding at a level of the contact surface of the at least one connection plate (4) such that material connected by said molding or over-molding i) causes a mechanical locking of the completed sub-assembly (5, 6, 7) in the receiving housings (8), and ii) constitutes sealing formations (11, 14, 14') that seal against gases between the end portions (2') of the pipes (2) and the cylinder head block at the level of the contact surface.

2. The process according to claim 1, wherein the step of mounting the bearing members (7) into the receiving housings (8) comprises a step of fitting the bearing parts (7) into the receiving housings (8) simultaneously with a step of installing the valves (6) into the ends (2') of the pipes (2).

3. The process according to claim 2, wherein the sealing formations (11, 14, 14') of the molding or over-molding together constitute an integral structure that comprise i) annular formations (11) that form or cover walls (12') of the at least one connection plate (4) with grooves (12) for receiving sealing joints (13), each extending around an outlet opening (3) of one of the pipes (2), and ii) material bridges (14, 14') that connect said annular formations (11) to one another and cover the bearing parts (7) by locking the bearing parts (7) in respective receiving housings (8), whereby said sealing formations (11, 14, 14') are essentially flush at the level of the contact surface of the at least one connection plate (4).

4. The process according to claim 3, wherein, for the two branches (7') of each bearing part (7), the rear ends (7"') are beveled so as to delimit a wedge-shaped groove (15) between the two branches (7') when the two branches (7') are drawn together so as to constitute a guide bearing in rotation, over-molded material (14, 14') filling the grooves (15) at corners of different bearing parts (7) which are apparent at the level of the contact surface of the at least one connection plate (4) when said bearing parts (7) are arranged in the respective receiving housings (8).

5. The process according to claim 3, wherein the end portions (2') of the pipes (2) comprise, around the outlet openings (3), outlines of the grooves (12), into which material of the molding or over-molding of the annular formations (11) is injected to constitute at least one of the inside walls (12') of said grooves (12), whereby the walls (12") of these outlines to be over-molded comprise projecting formations (17) configured to promote hooking of the molding or over-molding material and a seal between the molding or over-molding material and the inside wall(s) (12') in contact therewith.

6. The process according to claim 5, wherein the material for molding or over-molding that constitutes the sealing formations (11, 14, 14') is a thermoplastic material compatible with a thermoplastic material that forms the manifold or splitter body (1'), and has a softening temperature that is essentially equivalent to that of the thermoplastic material of the manifold or splitter body (1') so as to bring about an at least superficial softening of said thermoplastic material of the manifold or splitter body (1') for causing a partial refusion of the projecting formations (17).

7. The process according claim 2, further comprising:
providing a mechanical wedging and/or a stop of the bearing parts (7) in a mounting position or final engagement position in respective receiving housings (8); and
covering at least a portion of the rear ends (7''') of the branches (7') of said bearing parts (7) located set back relative to the contact surface of the at least one connection plate (4) with over-molding material.

8. The process according to claim 1, wherein the sealing formations (11, 14, 14') of the molding or over-molding together constitute an integral structure that comprise i) annular formations (11) that are accommodated in grooves (12) formed in the at least one connection plate (4) and that each extend around an outlet opening (3) of one of the pipes (2) and that each constitute a sealing joint (13) for a corresponding outlet opening (3), and ii) material bridges (14, 14') that connect said annular formations (11) to one another and cover the bearings bearing parts (7) by locking the bearing parts (7) in respective receiving housings (8), whereby said sealing formations (11, 14, 14') are essentially flush at the level of the contact surface of the at least one connection plate (4).

9. The process according to claim 8, wherein material for molding or over-molding the annular formations (11) is brought into close contact with at least one of the inside walls (12') of the grooves (12), whereby said wall(s) (12') comprise projecting formations (17), configured to promote hooking of the molding or over-molding material and a seal between the molding or over-molding material and the inside wall(s) (12') in contact therewith.

10. The process according to claim 1, wherein the sealing formations (11, 14, 14') of the molding or over-molding together constitute an integral structure, comprising at least parts of the at least one connection plate (4) and define at least partially the contact surface of the at least one connection plate (4), as well as the sealing means (13) of the assembly of said at least one connection plate (4) with the cylinder head block or sites for receiving such sealing means (13), a material of the molding or over-molding being compatible with a material that constitutes the manifold or splitter body (1').

11. The process according to claim 1, wherein the functional unit is produced by molding or over-molding the valves (6), partially or completely, on the shaft (5).

12. The process according to claim 11,
wherein the valves (6) are positioned in an offset manner relative to the shaft or the shaft segments (5), and
wherein each of the end portions (2') of the pipes (2) comprises an inside recess (9) having an imprint with a shape that mates with a shape of a corresponding valve (6) that is mounted in said end portion (2').

13. The process according to claim 11, wherein, during the over-molding or molding, disk-shaped formations (18) are produced on both sides of each valve (6), whereby said disk-shaped formations (18) are centered relative to the shaft (5) bearing the valves (6) or relative to a shaft segment (5') that is adjacent to a respective valve (6) and exhibit a diameter that is greater than said shaft (5) or shaft segment (5').

14. The process according to claim 13, wherein the end portions (2') of the pipes (2) and the bearing parts (7) comprise respective lateral recesses (9') that define, by mutual cooperation after installation of said bearing parts (7) in their respective receiving housings (8), cleared sites or recesses for an adjusted reception such that said disk-shaped formations (18) are configured to rotate, whereby said disk-shaped formations ensure a continuity of an inside surface of the end portions (2') of the pipes (2).

15. The process according to claim 1, wherein the functional unit is produced in a single piece by molding, whereby said functional unit (5, 6) comprises an alternating series of valves (6) and shaft segments (5') as a single piece.

16. The process according to claim 1,
wherein the intake or manifold body (1'), the functional unit, and the bearing parts (7) are made of a thermoplastic material,
wherein the intake or manifold body (1') is produced by assembling at least two elementary constituent parts by vibration welding or bonding, and
wherein the two branches (7') of the bearing parts (7) are connected, at level of respective front ends (7'') by a fabric of material forming a hinge.

17. An intake manifold or intake splitter (1) configured to be mounted to a cylinder head block of an internal combustion engine, comprising:
an intake manifold or splitter body (1') having a plurality of pipes (2) provided with end portions (2') defining outlet openings attached to at least one connection plate (4) that is configured for mounting said intake manifold or splitter (1) on the cylinder head block of the internal combustion engine, said at least one connection plate (4) defining a contact surface for sealing said intake manifold or splitter (1) with said cylinder head block;
a functional unit comprised of a shaft (5) with valves (6) mounted thereto, said valves (6) each being spaced from each other by a shaft segment (5') of the shaft (5) provided between the valves (6), the functional unit mounted in said end portions of the pipes (2) and in corresponding receiving housings (8) of said at least one connection plate (4);
bearing parts (7) mounted on the shaft (5) of the functional unit (5, 6) to form guide bearings in rotation of the functional unit (5, 6), the bearing parts (7) having the form of inserts that are mounted in the corresponding receiving housings (8), the bearing parts (7) comprising clothespin-like clamps that each comprise two opposing and mutually complementary branches (7') each with a front end (7'') and a rear end (7'''), each branch (7') having a recess (10) defining a portion of a rotary bearing; and
sealing formations (11, 14, 14') of molded or over-molded material at a level of said contact surface of the at least one connection plate (4), whereby said sealing formations (11, 14, 14') that are connected by molding or over-molding are configured to provide a mechanical lock of the functional unit (5, 6) and the bearing parts (7) in the respective receiving housings (8), and to seal against gases between the end portions (2') of the pipes (2) and the cylinder head block at the level of the contact surface,
wherein said bearing parts (7) are clamped around the shaft segments (5') such that the shaft segments (5') are enclosed within the recesses (10) of the bearing parts (7), and
wherein the front ends (7'') of the branches (7') are located at a bottom of said respective housings (8).

18. The manifold or splitter according to claim 17, wherein the recesses (10) of each of the bearing parts (7) is semi-cylindrical for defining a complementary cylindrical rotational bearing said bearing parts (7) being mounted with adjusted interlocking in the respective housings (8) and locked in position in the respective housings (8) by the molded or over-molded material.

19. The manifold or splitter according to claim 18, wherein the bearing parts (7) have, at the rear ends (7''') of the branches (7') that are close to the contact surface, a groove (15) with a triangular cross-section or a wedge shape, delimited by bevels opposite said branches (7'), the material bridges (14, 14') formed by the molded or over-molded material integrating formations at corners of the bearing parts (7) extending in an adjusted manner into the grooves (15).

20. The manifold or splitter according to claim 18,
wherein each bearing part (7) is provided with at least one shoulder (16') in contact with at least one shoulder (16) of the at least one connection plate (4) that mates with the corresponding receiving housing (8), and
wherein at least one portion of the rear ends (7''') of the branches (7') of each bearing part (7) is set back relative to the contact surface of the at least one connection plate (4) and is covered by a portion (14') of the over-molding material that is essentially in plate form and part of the material bridge and essentially flush with the contact surface.

21. The manifold or splitter according to claim 17, wherein the sealing formations (11, 14, 14') together constitute an integral structure that integrates i) annular formations (11) that form or cover walls (12') of the at least one connection plate (4) with grooves (12) for receiving sealing joints (13), each extending around an opening (3) of one of the pipes (2), and ii) material bridges (14, 14') that connect said annular formations (11) to one another and cover bearing parts (7) by locking the bearing parts (7) in respective receiving housings, whereby said sealing formations (11, 14, 14') are essentially flush at the level of the contact surface of the connection plate (4).

22. The manifold or splitter according to claim 17, wherein the sealing formations (11, 14, 14') together constitute an integral structure that integrates i) annular formations (11) that are accommodated in grooves (12) formed in the at least one connection plate (4) and that each extend around an outlet opening (3) of one of the pipes (2) and that each constitute a sealing joint (13) for a corresponding outlet opening (3), and ii) material bridges (14, 14') that connect said annular formations (11) to one another and cover the bearing parts (7) by locking the bearing parts (7) in respective receiving housings (8), whereby said sealing formations (11, 14, 14') are essentially flush at the level of the contact surface of the at least one connection plate (4).

23. The manifold or splitter according to claim 17,
wherein the functional unit (5, 6) is an integral part formed by molding the valves (6) and shaft segments (5') as a single piece, the functional unit further comprising disk-shaped formations (18) on both sides of each valve (6), whereby said disk-shaped formations (18) are centered relative to the shaft (5) that bears the valves (6) or relative to the shaft segment (5) that is adjacent to a respective valve (6), and have a diameter that is greater than said shaft or shaft segment (5), and
wherein the end portions (2') of the pipes (2) and the bearing parts (7) comprise respective lateral recesses (9') that define, by mutual cooperation, offset sites or recesses for an adjusted reception such that said disk-shaped formations (18) are configured to rotate, whereby said disk-shaped formations ensure a continuity of an inside surface of the end portions (2') of the pipes (2).

24. The manifold or splitter according to claim 17,
wherein the valves (6) are positioned in an offset manner relative to the shaft (5) or the shaft segments (5'), and
wherein each of the end portions (2') of the pipes (2) comprises an inside recess (9) with an imprint having a shape that mates with a shaped of the valve (6) that is mounted in said end portion (2').

25. The manifold or splitter according to claim 17,
wherein the intake or manifold body (1'), the functional unit (5, 6), and the bearing parts (7) are made of a thermoplastic material, whereby the molded or over-molded material is compatible with said thermoplastic material,
wherein the manifold body (1') is produced by assembling at least two elementary constituent parts by vibration welding or bonding and
wherein the two branches (7') of the bearing parts (7) are connected, at the front ends (7''), by a fabric of material forming a hinge.

26. An intake manifold or splitter according to claim 17, obtained by the production process according to claim 1.

27. A motor vehicle with an internal combustion engine having intake system that comprises an intake manifold or splitter according to claim 17.

\* \* \* \* \*